United States Patent
Patnana et al.

(10) Patent No.: US 10,655,058 B2
(45) Date of Patent: May 19, 2020

(54) TREATMENT FLUIDS FOR STIMULATION OF SUBTERRANEAN FORMATIONS

(71) Applicant: Halliburton Energy Services, Inc., Houston, TX (US)

(72) Inventors: Vijaya Kumar Patnana, Madhurwada (IN); Sairam Eluru, Pune (IN); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/097,004

(22) PCT Filed: Jun. 30, 2016

(86) PCT No.: PCT/US2016/040356
§ 371 (c)(1),
(2) Date: Oct. 26, 2018

(87) PCT Pub. No.: WO2018/004593
PCT Pub. Date: Jan. 4, 2018

(65) Prior Publication Data
US 2019/0322924 A1 Oct. 24, 2019

(51) Int. Cl.
*C09K 8/86* (2006.01)
*E21B 43/26* (2006.01)
(Continued)

(52) U.S. Cl.
CPC ............... *C09K 8/86* (2013.01); *C09K 8/506* (2013.01); *C09K 8/76* (2013.01); *E21B 43/26* (2013.01); *C09K 2208/30* (2013.01)

(58) Field of Classification Search
CPC ........ E21B 43/26; E21B 43/267; E21B 43/14; E21B 33/12; E21B 43/24; E21B 43/25;
(Continued)

(56) References Cited

U.S. PATENT DOCUMENTS

| 5,385,729 A | 1/1995 | Prencipe et al. |
| 7,279,446 B2 | 10/2007 | Colaco et al. |

(Continued)

FOREIGN PATENT DOCUMENTS

| CA | 2835511 | 11/2012 |
| WO | 2014085272 | 6/2014 |
| WO | 2014140055 | 9/2014 |

OTHER PUBLICATIONS

"Lessons Learned and Guideline for Matrix Acidizing With Viscoelastic Surfactant Diversion in Carbonate Formations" by Nasr-El-Din et al. dated Sep. 2006.
(Continued)

*Primary Examiner* — Zakiya W Bates
(74) *Attorney, Agent, or Firm* — Thomas Rooney; C. Tumey Law Group PLLC

(57) ABSTRACT

Method comprising introducing a treatment fluid into a subterranean formation, the treatment fluid comprising a pseudo-crosslinking agent and an acidic viscoelastic surfactant (AVS) base fluid, wherein the treatment fluid has a pH of less than 5. The AVS base fluid includes a zwitterionic viscoelastic surfactant, an acidic constituent, and a polar solvent and the zwitterionic viscoelastic surfactant is present in an amount in the range of from about 0.001% to about 15% by weight of active surfactant of the AVS base fluid. The treatment fluid performs a subterranean formation operation.

17 Claims, 1 Drawing Sheet

(51) Int. Cl.
*E21B 43/22* (2006.01)
*C09K 8/506* (2006.01)
*C09K 8/76* (2006.01)

(58) Field of Classification Search
CPC ...... C09K 8/74; C09K 2208/32; C09K 8/805; C09K 2208/30; C09K 8/68
See application file for complete search history.

(56) References Cited

U.S. PATENT DOCUMENTS

| | | |
|---|---|---|
| 8,056,630 B2 | 11/2011 | Huang et al. |
| 8,071,511 B2 | 12/2011 | Welton et al. |
| 8,887,805 B2 | 11/2014 | Reyes |
| 8,895,481 B2 | 11/2014 | Chen et al. |
| 9,029,313 B2 | 5/2015 | Man et al. |
| 9,074,120 B2 | 7/2015 | Welton |
| 9,150,780 B2 | 10/2015 | De Wolf et al. |
| 2010/0022418 A1 | 1/2010 | Milne et al. |
| 2010/0261622 A1 | 10/2010 | Crews et al. |
| 2010/0276152 A1 | 11/2010 | De Wolf et al. |
| 2013/0000913 A1 | 1/2013 | Welton et al. |
| 2013/0264060 A1 | 10/2013 | De Wolf et al. |
| 2013/0274155 A1 | 10/2013 | Nasr-El-Din et al. |
| 2013/0281329 A1 | 10/2013 | De Wolf et al. |
| 2014/0076572 A1 | 3/2014 | Gadberry et al. |
| 2014/0148372 A1 | 5/2014 | Man et al. |
| 2014/0246198 A1 | 9/2014 | Pandya et al. |
| 2015/0075790 A1* | 3/2015 | Loiseau ............. C09K 8/58 166/279 |
| 2015/0080271 A1 | 9/2015 | De Wolf et al. |
| 2015/0260021 A1 | 9/2015 | Reyes |
| 2015/0361330 A1 | 12/2015 | De Wolf et al. |
| 2016/0017210 A1 | 1/2016 | Li et al. |

OTHER PUBLICATIONS

"Impact of Organic Acids/Chelating Agents on Rheological Properties of Amidoamine Oxide Surfactant" by Nasr-El-Din et al. dated Feb. 2010.

"Nanotechnology Applications in Viscoelastic Surfactant Stimulation Fluids" by Huang et al. dated 2007.

"Armovis (R) EHS—Novel high temperature visoelastic surfactant" AzkoNobel dated May 17, 2017.

International Search Report and Written Opinion for Application No. PCT/US2016/040356 dated Mar. 31, 2017.

Canadian Search Report for Application No. 3,022,622 dated Nov. 22, 2019.

* cited by examiner

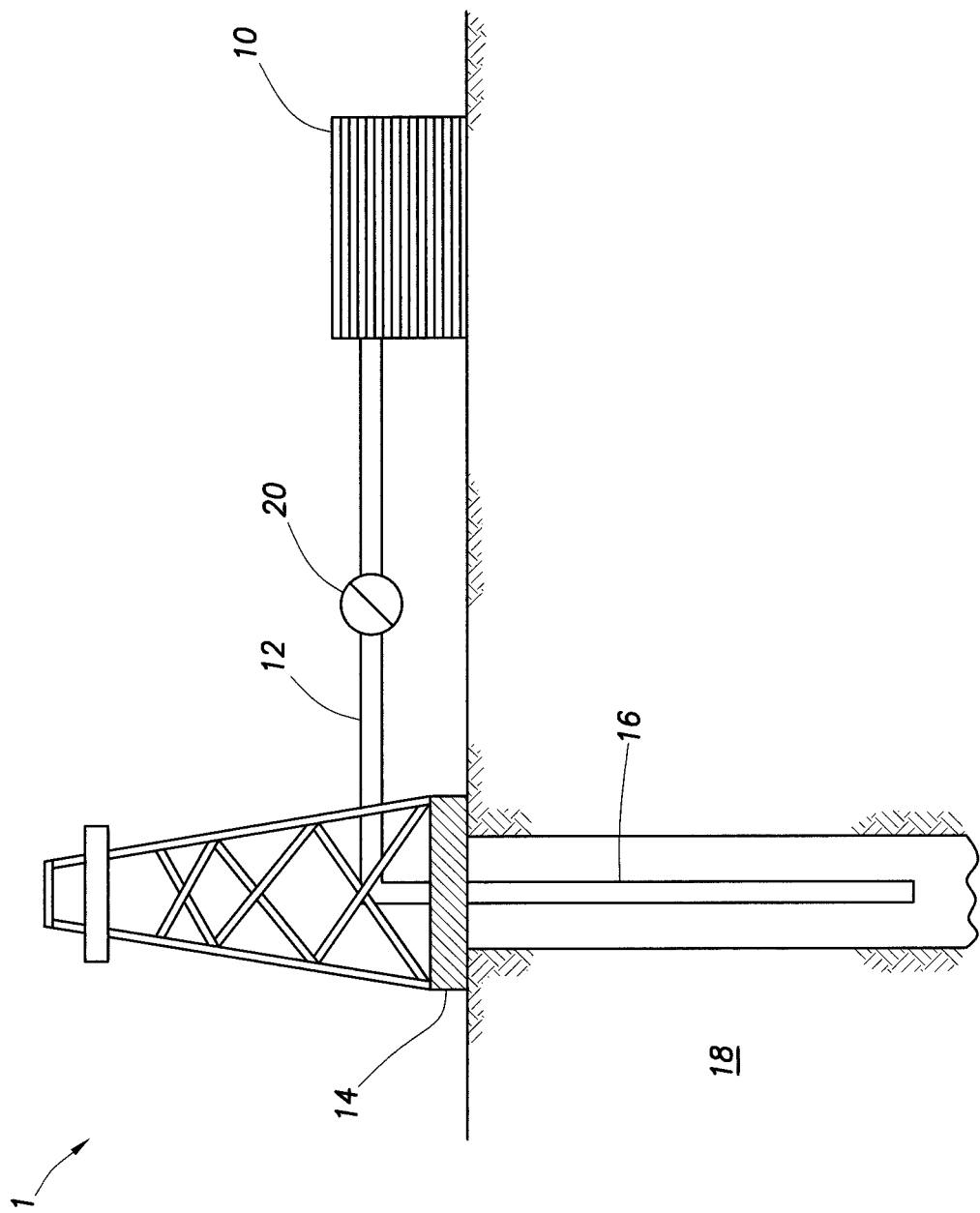

TREATMENT FLUIDS FOR STIMULATION OF SUBTERRANEAN FORMATIONS

BACKGROUND

The embodiments herein relate generally to treatment fluids for stimulation of subterranean formations and, more particularly, to treatment fluids comprising a pseudo-crosslinking agent and an acidic viscoelastic surfactant base fluid for stimulation of subterranean formations.

Treatment fluids may be used in a variety of subterranean treatment operations. Such treatment operations may include, without limitation, drilling operations, stimulation operations, production operations, remediation operations, sand control treatments, and the like. The term "treatment fluid," and grammatical variants thereof, refers to any fluid that may be used in a subterranean treatment operation (also referred to simply as "treatment" or "operation" herein) in conjunction with a desired function and/or for a desired purpose. The term "treatment fluid" does not imply any particular action by the fluid or any component thereof.

Well stimulation may be performed on a subterranean formation to achieve, increase, or restore fluid production therefrom, such as hydrocarbons including oil and gas. For example, a well that exhibits low permeability can be stimulated to instigate production from a formation. Further, well stimulation can be used to restore near-wellbore permeability and enhance flow from an already existing formation that has become under-productive or even unproductive. In some instances, the well stimulation operation is an acidizing operation, which may include matrix acidizing or fracture acidizing.

During a matrix acidizing operation, an acid-soluble material in a subterranean formation is dissolved by one or more acids to expand flow pathways in the subterranean formation, to create new flow pathways in the subterranean formation, to remove acid-soluble precipitation damage in the subterranean formation, and/or to increase flow to/from the matrix. The one or more acids are introduced at a pressure below the fracture pressure of the formation, but often at high rate. As used herein, the term "fracture pressure," and grammatical variants thereof, refers to the pressure above which injection of fluids will cause a formation to fracture hydraulically. Accordingly, during a matrix acidizing operation, the acid can penetrate the formation and extend the depth of the treatment without fracturing the formation.

Fracture acidizing, on the other hand, seeks to fracture the formation during the acidizing treatment. Accordingly, during a fracture acidizing operation, one or more acids are introduced into a subterranean formation at a pressure above the fracture pressure, and often at high rate, to dissolve acid-soluble materials therein. The introduced one or more acids thus may create or enhance fractures in the formation, while simultaneously etching channels in the fracture faces (i.e., the surface of the fractures) for enhancing fluid conductivity therethrough. The etching may form a nonuniform pattern that can permit fluid flow through the channels and the fractures to a surface location without propping open the fractures.

BRIEF DESCRIPTION OF THE DRAWINGS

The following FIGURES are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering various treatment fluids of the embodiments described herein to a downhole location, according to one or more embodiments of the present disclosure.

DETAILED DESCRIPTION

The embodiments herein relate generally to treatment fluids for stimulation of subterranean formations and, more particularly, to treatment fluids comprising a pseudo-crosslinking agent and an acidic viscoelastic surfactant base fluid for stimulation of subterranean formations.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as viscosity, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the FIGURES herein, the upward direction being toward the top of the corresponding FIGURE and the downward direction being toward the bottom of the corresponding FIGURE, the uphole direction being toward the surface of the well and the downhole direction being toward the toe of the well. Additionally, the embodiments depicted in the FIGURES herein are not necessarily to scale and certain features are shown in schematic form only or are exaggerated or minimized in scale in the interest of clarity.

The treatment fluids described herein provide acidizing, complexation of acid-soluble materials (e.g., carbonate materials, siliceous materials, and the like), fluid loss control, and/or diversion for use during a subterranean formation operation. Indeed, such characteristics may be realized simultaneously to permit a single treatment fluid formulated according to one or more embodiments of the present disclosure to afford all such characteristics during a single stage treatment fluid, such as during an acidizing treatment, where multiple fluids are traditionally used. It is to be appreciated that although the embodiments described herein are often used with reference to acidizing stimulation treatments, such as matrix acidizing and fracture acidizing, the treatment fluids described herein may be used in any subterranean formation operation that may benefit from the advantages of the treatment fluids described herein, provided that the acidic nature of the treatment fluids does not interfere with the particular operation. Such operations may include, but are not limited to, drilling operations, completion operations, sand control operations, scale dissolution and removal operations, consolidation operations, and the like, and any combination thereof. Moreover, no special mixing or equipment requirements are needed for preparation and use of the treatment fluids described herein.

Acidizing treatment systems are classified as regular acid-based (HCl, acetic, formic acids) or chelant-based systems. Other categories classify acid fluid systems as either chelant-based acid systems or surfactant-based acid systems. For example, chelant-based acid systems include fluids combining a chelant and an acid. Such chelant-based acid systems are effective at acidizing operations, but generally have low viscosity and do not impart either fluid loss control or diversion characteristics. For example, some chelant-based acid systems may be used for matrix acidizing and have chelant included therein in an amount of from about 5% to about 15% by weight, but only reach a viscosity of about 1-5 centipoise (cP) (similar to water). Such chelant-based acid systems are thus expected to provide minimal zonal coverage on their own due to inability to self-divert. The cost associated with chelant-based acid systems is thus increased when full coverage of the treatment zone cannot be realized.

Alternatively, surfactant-based acid systems include fluids combining a surfactant and an acid, which are also effective at acidizing operations, but generally also have low viscosity and cannot impart fluid loss control or diversion characteristics. In some instances, if a sufficient concentration of the acid is spent in a surfactant-based acid system (such that little or no acid is present), the pH of the fluid may be raised sufficiently to allow some fluid loss and/or self-diversion characteristics, particularly when the chosen surfactant is a viscoelastic surfactant. For example, the surfactant-based acid systems may have a surfactant having the formula R1-N—R2, where R1 and R2 can be hydrogen and/or an alkyl pendent group (e.g., an amine). In the initial state, the surfactant-based acid system will have an initial lower viscosity in high acidic conditions and will have no fluid loss or self-diversion characteristics. However, as the acid reacts with materials, such as carbonate materials in a formation, the pH rises and the viscosity of the system increases (e.g., by protonation of the amine group), thereby promoting fluid loss and/or self-diversion. Additionally, viscoelastic surfactants can additionally be crosslinked with calcium ions generated during an acidizing treatment, thus leading to increased viscosity. These surfactant-based systems can thus exhibit shear re-healing capacity.

As described above, the treatment fluids of the present disclosure comprise one or more pseudo-crosslinking agents and an acidic viscoelastic surfactant (AVS) base fluid. The AVS base fluids comprise a zwitterionic viscoelastic surfactant (also referred to simply as "zwitterionic surfactant"), an acidic constituent, and a polar solvent. Accordingly, the treatment fluids described herein comprise one or more pseudo-crosslinking agents, a zwitterionic viscoelastic surfactant, an acid constituent, and a polar solvent, which may be mixed in any logical order for preparation of the treatment fluid. For ease of description, the zwitterionic viscoelastic surfactant, the acid constituent, and the polar solvent are discussed herein collectively as the AVS base fluid. As used herein, the term "viscoelastic surfactant," and grammatical variants thereof, refers to a surfactant exhibiting both viscous and elastic properties. The term "zwitterionic viscoelastic surfactant," and grammatical variants thereof (e.g., "zwitterionic surfactant"), refers to a type of viscoelastic surfactant having both cationic and anionic centers attached to the same molecule. It is noteworthy that zwitterionic surfactants differ from amphoteric surfactants, although in some instances overlap, in that amphoteric surfactants are able to act or react as both an acid and a base, whereas zwitterionic surfactants have cationic and anionic characteristics. The AVS base fluid described herein may be characterized as having a micellar structure, characterized by the formation of micelles, or droplets of the surfactant dispersed in the AVS base fluid (e.g., due to the presence of the polar solvent).

The AVS base fluid described herein may be able to acidize a formation to dissolve acid-soluble materials therein, and the presence of the particular pseudo-crosslinking agents of the present disclosure advantageously enhances the viscoelasticity of the AVS base fluid while complexing the dissolved acid-soluble materials, thus providing their stabilization within the treatment fluid. Further, the synergistic relationship between the pseudo-crosslinking agent and the AVS base fluid to improve viscoelasticity enhances fluid loss control over traditional fluid loss control fluids, often significantly. Additionally, as the acidic component of the AVS base fluid is spent by dissolving acid-soluble materials within a subterranean formation and the pseudo-crosslinking agent complexes the dissolved acid-soluble material, the treatment fluids may transition into having relatively longer and more stable micelles, thereby resulting in increased viscosity and diversion characteristics. Thus, the treatment fluids may be used in a single stage to acidize and, thereafter, divert subsequent treatment fluids (e.g., those of the present disclosure or other introduced fluids) to untreated zones of the formation.

As an example, a particular wellbore in a subterranean formation may have a particular permeability profile. In order to perform an acidizing stimulation operation, any introduced fluids tend to follow the path of least resistance, often resulting in the least permeable areas receiving inadequate treatment. That is, the fluids flow first to the high permeability areas, and sometimes flow thereto exclusively. To achieve long interval acidizing due to such permeability profiles, traditional treatments require a multi-stage operation, such as where first a high pH chelating agent-containing fluid is introduced downhole for solubilizing acid-soluble materials at high permeability zones. Thereafter, in order to ensure that portions of the wellbore having lower permeabilities are treated, a separate diversion fluid (e.g., comprising diversion particulates) is introduced to temporarily block high permeability areas that have already been treated with the acidizing fluid. Then, at least a third separate acidizing fluid is introduced to solubilize zones having low permeabilities that were not previously treated with the first acidizing solution. Accordingly, traditional treatments require at least two acidizing fluids interspersed by at least one diversion fluid to be introduced into a formation to achieve acidizing stimulation. Differently, as described herein, the treatment fluids of the present disclosure achieve long interval acid stimulation in a single treatment.

As another advantage, the treatment fluids described herein are able to chelate, or complex, iron-based materials within a subterranean formation. Such chelation allows the treatment fluids to be used without the need to pickling treatments beforehand. Moreover, such iron chelation reduces or eliminates the need for iron controlling agents in the treatment fluids or in other multi-stage fluids used before or after the treatment fluids described herein.

The treatment fluids described herein accordingly show improved rheological properties due to the combination of the pseudo-crosslinking agent and the AVS base fluid. The fluid loss control characteristics are particularly effective for high temperature stimulation operations, such as acidizing stimulation operations. Most, if not all, viscoelastic surfactants alone (i.e., without the presence of the pseudo-crosslinking agent) have low initial viscosity. The treatment fluids described herein synergistically comprising both the pseudo-crosslinking agent and the AVS base fluid beneficially has an initially high viscosity. That is, the presence of the pseudo-crosslinking agent enhances the initial viscosity of the AVS base fluid by as much as greater than about 50% compared to, for example, pH which can only increase viscosity by about 30%. Moreover, the treatment fluids described herein additionally have high pH due to their acidic nature, further enhancing viscosity.

Accordingly, the treatment fluids described herein provide high initial viscosity, fluid loss control, and diversion properties, particularly with elevated pH. Moreover, the concentration of the pseudo-crosslinking agent, as described below, can be tailored to achieve the desired viscosity for a particular subterranean operation, which may be in some particular instances about 0.6 molar (M) or about 12% by weight per volume of the AVS base fluid.

The pH of the treatment fluids described herein are generally less than about 5, encompassing any value and subset therebetween. In certain particular embodiments, the pH is less than about 4, less than about 3, less than about 2, less than about 1, or even less. In preferred embodiments, the pH of the treatment fluids described herein is less than about 2.5, less than about 2, less than about 1.5, or less than about 1. The more acidic the pH, the more likely the characteristics of viscosity, fluid loss control, and diversion properties are to be realized, which may be more beneficial for some types of subterranean formations (e.g., low permeability formations) than others. Accordingly, the selected pH for the particular treatment fluids is dependent on, among other things, the particular subterranean formation, the selected composition of the treatment fluid, the desired characteristics of the treatment fluid, and the like, and any combination thereof.

The AVS base fluid, as described above, may include a zwitterionic viscoelastic surfactant, an acid constituent, and a polar solvent. The pH of the AVS base fluid may be supplied by the acid constituent, and thus the amount of acid constituent included may depend on the desired pH. The micellar structure that may be achieved by the AVS base fluid results in zwitterionic viscoelastic surfactant droplets suspended in the AVS base fluid due to the presence of the polar solvent.

The micellar nature of the AVS base fluids of the present disclosure may further be enhanced by inclusion of nanoparticulates. The nanoparticulates may associate with the zwitterionic viscoelastic surfactant micelles through chemisorption and surface-charge attraction to stabilize fluid viscosity, particularly at elevated temperatures, such as those that are greater than about 93° C., or even higher (e.g., greater than 107° C., or up to at least 150° C.). The nanoparticulates thus additionally enhance fluid loss control and fluid efficiency. The nanoparticulates may have a unit mesh size in the range of nanometer (nm) to 100 nm, encompassing any value and subset therebetween. As used herein, the term "unit mesh size," and grammatical variants thereof, refers to a size of an object (e.g., a particulate) that is able to pass through a square area having each side thereof equal to a specified numerical value. In some instances, the nanoparticulates have an average size of about 30 nm to about 40 nm, encompassing any value and subset therebetween. The nanoparticulates may be made of any material having the necessary unit mesh size, and preferably may be inorganic crystals that are insoluble in water, oil, or solvents.

The zwitterionic viscoelastic surfactant may be any viscoelastic surfactant that exhibits zwitterionic properties, and which can be acidic and used in a subterranean formation for performing operations downhole, such as acid stimulation operations. Beneficially, the zwitterionic viscoelastic surfactants may break down when contacted with hydrocarbons, such as during flow back to a surface location, thereby minimizing any residue that could lead to formation damage (e.g., impacting overall formation permeability) or shut-in requirements. Examples of suitable zwitterionic viscoelastic surfactants for use in forming the AVS base fluid described herein include, but are not limited to, erucicdimethyl amidopropyl betaine, erucicamidopropyl hydroxypropyl sultaine, dicarboxylic coconut derived sodium salt, cocamidopropyl dimethylamide, cocoamidopropyl betaine, an alkylether hydroxypropyl sultaine, an amine oxide, oleylamidopropyl betaine, erucylamido propyl betaine, hexadecanol glycidyl ether glycine betaine, hexadecanol polyoxyethylene(3) glycidyl ether glycine betaine, and any combination thereof.

In some embodiments, the chemical structure of a suitable zwitterionic viscoelastic surfactant is as follows as Structure I:

Structure I

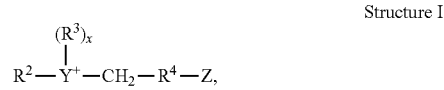

wherein R2, R3, and R4 may be a hydrogen, alkyl, alkylarylalkyl, alkoxyalkyl, alkylaminoalkyl, alkylamidoalkyl, or hydroxy alkyl radical and wherein "alkyl" represents a group that contains from about 1 to about 24 carbon atoms which may be branched or straight chained and which may be saturated or unsaturated alkenyl; R2, R3, and R4 may comprise from 0 to about 10 ethylene oxide moieties and from 0 to about 1 glyceryl moiety; Y may be a nitrogen atom, a phosphorus atom, or a sulfur atom; X is 1 when Y is a sulfur atom, and 2 when Y is a nitrogen or phosphorus atom; Z may be a radical of carboxylate, sulfonate, sulfate, phosphonate, or phosphate groups.

As an example, the chemical structure of erucicamidopropyl hydroxypropyl sultaine, a preferred zwitterionic viscoelastic surfactant is provided below as Structure II for illustration.

Structure II

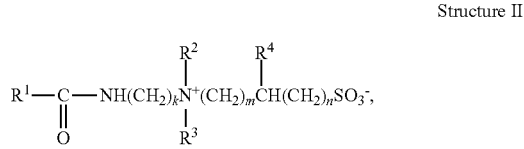

wherein R1 may be a saturated or unsaturated, hydrocarbon group of from about 17 to about 29 carbon atoms; R2 and R3 may be each independently selected from a straight chain or branched, alkyl or hydroxyalkyl group of from 1 to about carbon atoms; R4 may be a hydrogen, hydroxyl, alkyl, or hydroxyalkyl groups of from 1 to about 4 carbon atoms; k may be an integer of from 2-20; m may be an integer of from 1-20; and n may be an integer of from 0-20.

The viscosity effect due to pseudo-crosslinking of the treatment fluids described herein comprising erucicamidopropyl hydroxypropyl sultaine (Structure II) and an MGDA pseudo-crosslinking agent is discussed in Example 1 below.

The chemical structure of erucicdimethyl amidopropyl betaine, another preferred zwitterionic viscoelastic surfactant is provided below as Structure III for illustration.

Structure III

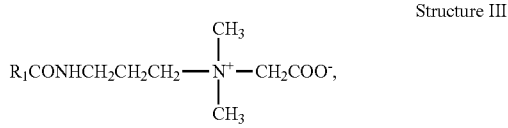

wherein R1 may be a hydrocarbon group that may be branched or straight chained, aromatic, aliphatic or olefinic and has from about 14 to about 26 carbon atoms. R1 may contain an amine.

The viscosity of a treatment fluid comprising erucicdimethyl amidopropyl betaine (Structure III) and a GLDA pseudo-crosslinking agent may increase substantially upon reaching greater than about pH 4 (i.e., after the acid constituent is spent which can lead to an increased pH), thus aiding in self-diversion of the treatment fluid. For example, the pseudo-crosslinking nature of the combination of an AVS base fluid comprising erucicdimethyl amidopropyl betaine and a GLDA pseudo-crosslinking agent increases viscosity and elasticity by about two orders of magnitude compared to the same fluid without the pseudo-crosslinking agent. In some instances, the ratio of the zwitterionic viscoelastic surfactant to the GLDA pseudo-crosslinking agent is expected to achieve maximum viscosity (and elasticity) at about 1:1.

In other embodiments, the selected zwitterionic viscoelastic surfactant is branched in nature, which may extend the temperature applicability of the treatment fluids described herein to subterranean formations having particularly high temperatures, such as greater than about 93° C., or even higher (e.g., greater than 107° C., or up to at least 150° C.). Any one of the above described zwitterionic viscoelastic surfactants may be branched, having an open chain of atoms with one or more side chains attached thereto.

It is to be appreciated that the various constituents of the AVS base fluids and pseudo-crosslinking described herein may be included in any combination to achieve a desired treatment fluid having desired characteristics, without departing from the scope of the present disclosure.

The zwitterionic viscoelastic surfactant may be included in the AVS base fluids described herein in an amount in the range of from about 0.0001% to about 15% by weight of active surfactant of the total AVS base fluid (including the surfactant, acid constituent, and polar solvent), encompassing any value and subset therebetween. For example, the zwitterionic viscoelastic surfactant may be included in the AVS base fluids in an amount in the range of from about 0.001% to about 1%, or about 1% to about 3%, or about 3% to about 6%, or about 6% to about 9%, or about 9% to about 12%, or about 12% to about 15% by weight of active surfactant of the total AVS base fluid, encompassing any value and subset therebetween. As used herein the term "by weight of active surfactant" means by weight of the pure surfactant, not considering the weight of any solvents used to dilute the surfactant. Higher values beneficial due to higher dissolving power, better spent fluid stabilization, easier to divert.

Consumption, or spending, of the acidic constituent or pseudo-crosslinking agent increases the pH of the treatment fluids described herein and, in particular, the AVS base fluid alone or in combination with the pseudo-crosslinking agent. Suitable acid constituents may thus be any acid or acid compound capable of undergoing an increase in pH as a function of spending (or being spent) and suitable for use in a subterranean formation operation. The acid constituents may be inorganic acids, mineral acids, organic acids, any salt thereof, and any combination thereof that are soluble in the polar solvent and/or zwitterionic viscoelastic surfactant described herein. Examples of suitable acid constituents include, but are not limited to, hydrochloric acid, hydrofluoric acid, phosphonic acids, nitric acid, sulfuric acid, phosphoric acid, potassium dihydrogenphosphate, sodium dihydrogenphosphate, sodium sulfite, potassium sulfite, sodium pyrosulfite (sodium metabisulfite), potassium pyrosulfite (potassium metabisulfite), acid sodium hexametaphosphate, acid potassium hexametaphosphate, acid sodium pyrophosphate, acid potassium pyrophosphate, sulfamic acid, acetic acid, carbonic acid, p-toluene sulfonic acid, citric acid, propionic acid, butyric acid, valeric acid, dicarboxylic acids (e.g., oxalic acid, malonic acid, succinic acid, glutaric acid, adipic acid, pimelic acid, fumaric acid, maleic acid), acidic amino acids (e.g., glutamic acid, aspartic acid), hydroxy acids (e.g., glycolic acid, lactic acid, hydroxyacrylic acid, 2-hydroxybutyric acid, glyceric acid, tartronic acid, malic acid, tartaric acid, citric acid), any salt thereof, and any combination thereof.

The acid constituent may be included in the AVS base fluids described herein in an amount in the range of from about 0.001% to about 45% by weight of the total AVS base fluid (including the surfactant, acid constituent, and polar solvent), encompassing any value and subset therebetween. The acid constituent may be included in the AVS base fluids in an amount in the range of from about 0.001% to about 1%, or about 1% to about 9%, or about 9% to about 18%, or about 18% to about 27%, or about 27% to about 36%, or about 36% to about 45% by weight of the total AVS base fluid, encompassing any value and subset therebetween. The amount of acid constituent will be dependent at least on the desired pH for the particular treatment fluid.

The polar solvent for use in the embodiments of the present disclosure may be any fluid compatible with the treatment fluid constituents described herein, and which may be used to form the micellar structure of the treatment fluid with the zwitterionic viscoelastic surfactant and to serve as a carrier for the acid constituent. Examples of suitable polar solvents may include, but are not limited to, aqueous-based solvents, aqueous-miscible solvents, and any combination thereof. Suitable aqueous-based solvents may include fresh water, saltwater (e.g., water containing one or more salts dissolved therein), brine (e.g., saturated salt water), seawater, wastewater, produced water, and any combination thereof.

The polar solvent may be included in the AVS base fluids described herein in an amount in the range of of from about 20% to about 95% by weight of the total AVS base fluid (including the surfactant, acid constituent, and polar solvent), encompassing any value and subset therebetween. For example, the polar solvent may be included in the AVS base fluid in an amount in the range of from about 20% to about 35%, or about 35% to about 50%, or about 50% to about 65%, or about 65% to about 80%, or about 80% to about 95% by weight of the total AVS base fluid, encompassing any value and subset therebetween.

The pseudo-crosslinking agents described herein synergistically interact with the AVS base fluid to provide the treatment fluids described herein. For example, the pseudo-crosslinking agents provide enhanced viscosity, fluid loss control, and diversion characteristics to the treatment fluids of the present disclosure. Without being bound by theory, in at least one instance it is believed that a quaternary amine in the AVS base fluid provided by the zwitterionic viscoelastic surfactant interacts or reacts with an anionic components of a pseudo-crosslinking agent to cause the treatment fluid to adopt these characteristics. Examples of suitable pseudo-crosslinking agents for use in the embodiments described herein may include, but are not limited to, glutamic acid diacetic acid (GLDA), methylglycinediacetic acid (MGDA), sodium lauryl ether sulfate, a linear alkyl sodium sulfonate, neutralized etidronic acid, diethylene triamine petaacetic acid, ethylenediaminetetraacetic acid, polyethyleneimine ethoxylate, N-(hydroxyethyl)-ethylenediaminetriacetic acid (HEDTA), iminodisuccinic acid, polyaspartic acid, and/or ethylenediamine-N,N'-disuccinic acid, hydroxyethylene iminodisuccinic aid (HIDS), β-alanine diacetic acid (β-ADA), ethylenediaminedisuccinic acid, S,S-ethylenediaminedisuccinic acid (EDDS), iminodisuccinic acid (IDS), polyamino disuccinic acids, N-bis[2-(1,2-dicarboxyethoxy)ethyl]glycine (BCA6), N-bis[2-(1,2-dicarboxyethoxy)ethyl] aspartic acid (BCA5), N-bis[2-(1,2-dicarboxyethoxy)ethyl] methylglycine (MCBA5), N-tris[(1,2-dicarboxyethoxy)ethyl]amine (TCA6), N-bis[2-(carboxymethoxy)ethyl] glycine (BCA3), N-bis[2-(methylcarboxymethoxy)ethyl] glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof. As used herein, the term "derivative" means any compound that is directly made from one of the listed compounds, for example, by replacing one atom in one of the listed compounds with another atom or group of atoms, ionizing one of the listed compounds, or creating a salt of one of the listed compounds.

In some preferred embodiments, the pseudo-crosslinking agent is GLDA, MGDA, HIDS, HEDTA, a sodium salt thereof, an ammonium salt thereof, and any combination thereof. In some embodiments, the ammonium salts of GLDA and/or MGDA are preferred over their sodium salt counterparts, as they are believed to provide increased characteristics (e.g., viscosity, fluid loss control, diversion) to the treatment fluids described herein comparatively.

The amount of pseudo-crosslinking agent will depend on the desired characteristics of the treatment fluids described herein. Generally, the pseudo-crosslinking agent described herein may be present in an amount in the range of from about 0.001% to about 20%% by weight of the AVS base fluid, encompassing any value and subset therebetween. For example, the pseudo-crosslinking agent may be present in an amount in the range of from about 0.001% to about 1%, or about 1% to about 5%, or about 5% to about 10%, or about 10% to about 15%, or about 15% to about 20% by weight of the AVS base fluid, encompassing any value and subset therebetween.

The treatment fluids described herein may further include an additive for achieving one or more desired functions (e.g., in addition to achieving the acidizing operation), provided that the additive does not adversely interfere with the function and constituents of the treatment fluids, as described above. Examples of suitable additives may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated.

The pump maybe a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid or a portion thereof may, in some embodiments, flow back to wellhead 14 and exit subterranean formation 18. In some embodiments, the treatment fluid that has flowed back to wellhead 14 may subsequently be recovered and recirculated to subterranean formation 18, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A method comprising: introducing a treatment fluid into a subterranean formation, the treatment fluid comprising a pseudo-crosslinking agent and an acidic viscoelastic surfactant (AVS) base fluid, wherein the treatment fluid has a pH of less than 5, wherein the AVS base fluid includes a zwitterionic viscoelastic surfactant, an acidic constituent, and a polar solvent, and wherein the zwitterionic viscoelastic surfactant is present in an amount in a range of from about 0.001% to about 15% by weight of active surfactant of the AVS base fluid; and performing a subterranean formation operation.

Embodiment B

A system comprising: a tubular extending into a subterranean formation through a wellhead; and a pump fluidly coupled to the tubular, the tubular containing a treatment fluid, wherein the treatment fluid has a pH of less than 5 and comprising: a pseudo-crosslinking agent and an acidic viscoelastic surfactant (AVS) base fluid, wherein the AVS base fluid includes a zwitterionic viscoelastic surfactant, an acidic constituent, and a polar solvent, and wherein the zwitterionic viscoelastic surfactant is present in an amount in a range of from about 0.001% to about 15% by weight of active surfactant of the AVS base fluid.

Embodiment C

A treatment fluid for use in performing a subterranean formation operation comprising: a pseudo-crosslinking agent and an acidic viscoelastic surfactant (AVS) base fluid, wherein the AVS base fluid includes a zwitterionic viscoelastic surfactant, an acidic constituent, and a polar solvent, wherein the zwitterionic viscoelastic surfactant is present in an amount in a range of from about 0.01% to about 10% by weight of the AVS treatment fluid, and wherein the treatment fluid has a pH of less than 5.

Each of Embodiments A, B, and C may have one or more of the following additional elements in any combination:

Element 1: Wherein the treatment fluid has a pH of less than 3.

Element 2: Wherein the treatment fluid has a pH of less than 2.

Element 3: Wherein the pseudo-crosslinking agent is selected from the group consisting of glutamic acid diacetic acid, methylglycinediacetic acid, sodium lauryl ether sulfate, a linear alkyl sodium sulfonate, neutralized etidronic acid, diethylene triamine petaacetic acid, ethylenediaminetetraacetic acid, polyethyleneimine ethoxylate, N-(hydroxyethyl)-ethylenediaminetriacetic acid (HEDTA), iminodisuccinic acid, polyaspartic acid, and/or ethylenediamine-N,N'-disuccinic acid, hydroxyethylene iminodisuccinic aid, β-alanine diacetic acid, ethylenediaminedisuccinic acid, S, S-ethylenediaminedisuccinic acid, iminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-bis[2-(carboxymethoxy)ethyl]glycine, N-bis [2-(methylcarboxymethoxy)ethyl]glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethyl amino) succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N, N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof.

Element 4: Wherein the pseudo-crosslinking agent is present in the treatment fluid in an amount in a range of from about 0.001% to about 20% by weight of the AVS base fluid.

Element 5: Wherein the zwitterionic viscoelastic surfactant is selected from the group consisting of erucic dimethyl amidopropyl betaine, erucic amidopropyl hydroxypropyl sultaine, dicarboxylic coconut derived sodium salt, cocamidopropyl dimethylamide, cocoamidopropyl betaine, an alkylether hydroxypropyl sultaine, an amine oxide, oleylamidopropyl betaine, erucylamido propyl betaine, hexadecanol glycidyl ether glycine betaine, hexadecanol polyoxyethylene(3) glycidyl ether glycine betaine, and any combination thereof.

Element 6: Wherein the acidic constituent is selected from the group consisting of an inorganic acid, a mineral acid, an organic acid, any salt thereof, and any combination thereof.

Element 7: Wherein the acidic constituent is included in the AVS base fluid in an amount in a range of from about 0.001% to about 45% by weight of the AVS base fluid.

Element 8: Wherein the subterranean formation operation is an acidizing operation.

Element 9: Wherein the subterranean formation operation is an acidizing operation and further comprising dissolving an acid-soluble material in the subterranean formation.

By way of non-limiting example, exemplary combinations applicable to A, B, and/or C include: Any of A, B, and/or C with Elements 1-9; 1 and 2; 1 and 3; 1 and 4; 1 and 5; 1 and 6; 1 and 7; 1 and 8; 1 and 9; 2 and 3; 2 and 4; 2 and 5; 2 and 6; 2 and 7; 2 and 8; 2 and 9; 3 and 4; 3 and 5; 3 and 10 6; 3 and 7; 3 and 8; 3 and 9; 4 and 5; 4 and 6; 4 and 7; 4 and 8; 4 and 9; 5 and 6; 5 and 7; 5 and 8; 5 and 9; 6 and 7; 6 and 8; 6 and 9; 7 and 8; 7 and 8; 8 and 9; 1, 2, and 3; 1, 2, and 4; 1, 2, and 5; 1, 2, and 6; 1, 2, and 7; 1, 2, and 8; 1, 2, and 9; 2, 3, and 4; 2, 3, and 5; 2, 3, and 6; 2, 3, and 7; 2, 3, and 8; 2, 3, and 9; 3, 4, and 5; 3, 4, and 6; 3, 4, and 7; 3, 4, and 8; 3, 4, and 9; 4, 5, 15 and 6; 4, 5, and 7; 4, 5, and 8; 4, 5, and 9; 2, 3, 4, and 6; 2, 3, 4, and 7; 3, 4, 5, and 8; 1, 2, 3 and 4; 3, 6, 7, and 8; 1, 4, 6, and 8; 3, 4, 7 and 9; 6, 7, 8, and 9; 3, 4, 6, 8, and 9; and the like; and any combination of 1-9, without limitation.

To facilitate a better understanding of the embodiments of the present disclosure, the following example is given. In no way should the following example be read to limit, or to define, the scope of the disclosure.

EXAMPLE

In this example, the viscosity of a treatment fluid described herein was evaluated using an AVS base fluid in combination with an MGDA pseudo-crosslinking agent as compared to the same AVS base fluid having no pseudo-crosslinking agent, as pH is selectively increased. Specifically, a stock 300 milliliter (mL) AVS base fluid was prepared by adding (1) 30 mL of an acid constituent of 35% hydrochloric acid (HCl) in tap water (from Pune, India) to (2) 255 mL of a polar solvent (Pune tap water) in a blender. Thereafter, (3) 15 mL of a 40-50% active weight (in a mixed solvent system containing ethanol, propylene glycol and water) zwitterionic viscoelastic surfactant of erucamidopropyl hydroxypropyl sultaine was added to the blender and blended at high rpm for about 15 minutes. The stock AVS base fluid was then divided into 2 equal parts of 150 mL each (Sample 1) and (Sample 2) for viscosity testing using a FANN® Model 35 Viscometer equipped with an R1 rotor sleeve, B1 bob, and F1 torsion spring operating at 300 rpm, room temperature, and a shear rate of 511 inverse seconds (s-1), and having an error of ±2 cP. The pH of each Sample was also evaluated, having an error of ±0.03. The initial pH and viscosity of the AVS base fluid alone for Sample 1 and Sample 2 were tested, each having an initial pH of 0.5 and an initial viscosity of 25 cP. To Sample 1, increasing amounts of MGDA pseudo-crosslinking agent of was added to achieve pH values of 1, 2, 3, and 4 and the viscosity was measured. To Sample 2, sodium hydroxide (NaOH) was added to increase the pH to achieve pH values of 1 and 8 and the viscosity was measured. The viscosity readings are provided in Table 1 below.

TABLE 1

| Sample 1 (AVS base fluid + MGDA) | | Sample 2 (AVS Base fluid = NaOH) | |
| --- | --- | --- | --- |
| pH Initial = 0.5 | Viscosity (cP) Initial - 25 cP | pH Initial = 0.5 | Viscosity (cP) Initial - 25 cP |
| 1 | 50 | 1 | 32 |
| 2 | 65 | 8 | 35 |
| 3 | 60 | — | — |
| 4 | 60 | — | — |

As shown, the addition of MGDA pseudo-crosslinking agent in an amount to reach pH 1 resulted in a doubling of the viscosity (from 25 cP initially to 50 cP). This viscosity increase is due to the pseudo-crosslinking nature of the treatment fluid because the same increase in pH of Sample 2 to pH 1 resulted in a far lesser viscosity of only 32 cP. Indeed, further increase in viscosity of Sample 1 increased viscosity to 65 cP, and then to 60 cP, whereas heightened pH of pH 8 of Sample 2 due to the NaOH resulted in a viscosity of only 35 cP. Accordingly, the synergistic relationship between the constituents of the treatment fluids described herein to elevate viscosity is apparent. Moreover, fine tuning of the zwitterionic viscoelastic surfactant and pseudo-crosslinking agent concentrations can be used to achieve desired viscosity values.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   introducing a treatment fluid into a subterranean formation, the treatment fluid comprising a pseudo-crosslinking agent and an acidic viscoelastic surfactant (AVS) base fluid,
   acidizing the subterranean formation with the treatment fluid to dissolve acid-soluble materials, wherein the acidizing is completed in a single stage; and
   diverting the treatment fluid to untreated zones of the subterranean formation,
   wherein the treatment fluid has a pH of less than 5,
   wherein the AVS base fluid includes a zwitterionic viscoelastic surfactant, an acidic constituent, and a polar solvent, and
   wherein the zwitterionic viscoelastic surfactant is present in an amount in a range of from about 0.001% to about 15% by weight of active surfactant of the AVS base fluid.

2. The method of claim 1, wherein the treatment fluid has a pH of less than 3.

3. The method of claim 1, wherein the treatment fluid has a pH of less than 2.

4. The method of claim 1, wherein the pseudo-crosslinking agent is selected from the group consisting of glutamic acid diacetic acid, methylglycinediacetic acid, sodium lauryl ether sulfate, a linear alkyl sodium sulfonate, neutralized etidronic acid, diethylene triamine petaacetic acid, ethylenediaminetetraacetic acid, polyethyleneimine ethoxy late, N-(hydroxyethyl)-ethylenediaminetriacetic acid (HEDTA), iminodisuccinic acid, polyaspartic acid, and/or ethylenediamine-N,N'-disuccinic acid, hydroxy ethylene iminodisuccinic aid, β-alanine diacetic acid, ethylenediaminedisuccinic acid, S,S-ethylenediaminedisuccinic acid, iminodisuccinic acid, polyamino disuccinic acids, N-bis[2-(1,2-dicarboxyethoxy)ethyl]glycine, N-bis[2-(1,2-dicarboxyethoxy) ethyl]aspartic acid, N-bis[2-(1,2-dicarboxyethoxy)ethyl]methylglycine, N-tris[(1,2-dicarboxyethoxy)ethyl]amine, N-bis[2-(carboxymethoxy)ethyl]glycine, N-bis[2-(methylcarboxymethoxy)ethyl]glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino) succinic acid, diethylenetriamine-N,N''-disuccinic acid, triethylenetetramine-N,N'''-disuccinic acid, 1,6-hexamethylenediamine-N,N'-disuccinic acid, tetraethylenepentamine- N,N'''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine- N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, any salt thereof, any derivative thereof, and any combination thereof.

5. The method of claim 1, wherein the pseudo-crosslinking agent is present in the treatment fluid in an amount in a range of from about 0.001% to about 20% by weight of the AVS base fluid.

6. The method of claim 1, wherein the zwitterionic viscoelastic surfactant is selected from the group consisting of erucic dimethyl amidopropyl betaine, erucic amidopropyl hydroxypropyl sultaine, dicarboxylic coconut derived sodium salt, cocamidopropyl dimethylamide, cocoamidopropyl betaine, an alkylether hydroxypropyl sultaine, an amine oxide, oleylamidopropyl betaine, erucylamido propyl betaine, hexadecanol glycidyl ether glycine betaine, hexadecanol polyoxyethylene(3) glycidyl ether glycine betaine, and any combination thereof.

7. The method of claim 1, wherein the acidic constituent is selected from the group consisting of an inorganic acid, a mineral acid, an organic acid, any salt thereof, and any combination thereof.

8. The method of claim 1, wherein the acidic constituent is included in the AVS base fluid in an amount in a range of from about 0.001% to about 45% by weight of the AVS base fluid.

9. A system comprising:
a tubular extending into a subterranean formation through a wellhead; and
a pump fluidly coupled to the tubular, the tubular containing a treatment fluid, wherein the treatment fluid has a pH of less than 5 and comprising:
a pseudo-crosslinking agent and an acidic viscoelastic surfactant (AVS) base fluid,
wherein the AVS base fluid includes a zwitterionic viscoelastic surfactant, an acidic constituent, and a polar solvent,
wherein the zwitterionic viscoelastic surfactant is present in an amount in a range of from about 0.001% to about 15% by weight of active surfactant of the AVS base fluid,
wherein the treatment fluid acidizes the subterranean formation to dissolve acid-soluble materials in a single stage, and
wherein the treatment fluid is diverted to untreated zones of the subterranean formation.

10. The system of claim 9, wherein the treatment fluid has a pH of less than 3.

11. The system of claim 9, wherein the treatment fluid has a pH of less than 2.

12. The system of claim 9, wherein the pseudo-crosslinking agent is selected from the group consisting of glutamic acid diacetic acid, methylglycinediacetic acid, sodium lauryl ether sulfate, a linear alkyl sodium sulfonate, neutralized etidronic acid, diethylene triamine petaacetic acid, ethylenediaminetetraacetic acid, polyethyleneimine ethoxylate, N-(hydroxyethyl)-ethylenediaminetriacetic acid (HEDTA), iminodisuccinic acid, polyaspartic acid, and/or ethylenediamine-N,N'-disuccinic acid, hydroxyethylene iminodisuccinic aid, β-alanine diacetic acid, ethylenediaminedisuccinic acid, S, S-ethylenediaminedisuccinic acid, iminodisuccinic acid, polyamino disuccinic acids, N-bis[2-(1,2-dicarboxyethoxy)ethyl]glycine, N-bis[2-(1,2-clicarboxyethoxy) ethyl] aspartic acid, N-bis[2-(1,2-dicarboxyethoxy)ethyl]methylglycine, N-tris[(1,2-dicarboxyethoxy)ethyl]amine, N-bis[2-(carboxymethoxy)ethyl]glycine, N-bis[2-(methylcarboxymethoxy)ethyl]glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethyl amino) succinic acid, diethylenetriamine-N,N''-disuccinic acid, triethylenetetramine-N,N succinic acid, 1,6-hexamethylenediamine-N,N'-disuccinic acid, tetraethylenepentamine- N,N'''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine- N,N'-di succinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxy succinyl) aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof.

13. The system of claim 9, wherein the pseudo-crosslinking agent is present in the treatment fluid in an amount in a range of from about 0.001% to about 20% by weight of the AVS base fluid.

14. The system of claim 9, wherein the zwitterionic viscoelastic surfactant is selected from the group consisting of erucic dimethyl amidopropyl betaine, erucic amidopropyl hydroxypropyl sultaine, dicarboxylic coconut derived sodium salt, cocamidopropyl dimethylamide, cocoamidopropyl betaine, an alkylether hydroxypropyl sultaine, an amine oxide, oleylamidopropyl betaine, erucylamido propyl betaine, hexadecanol glycidyl ether glycine betaine, hexadecanol polyoxyethylene(3) glycidyl ether glycine betaine, and any combination thereof.

15. The system of claim 9, wherein the acidic constituent is selected from the group consisting of an inorganic acid, a mineral acid, an organic acid, any salt thereof, and any combination thereof.

16. The system of claim 9, wherein the acidic constituent is included in the AVS base fluid in an amount in a range of from about 0.001% to about 45% by weight of the AVS base fluid.

17. A treatment fluid for use in performing a subterranean formation operation comprising:
a pseudo-crosslinking agent and an acidic viscoelastic surfactant (AVS) base fluid,
wherein the AVS base fluid includes a zwitterionic viscoelastic surfactant, an acidic constituent, and a polar solvent,
wherein the zwitterionic viscoelastic surfactant is present in an amount in a range of from about 0.01% to about 10% by weight of the AVS treatment fluid,
wherein the treatment fluid has a pH of less than 5,
wherein the treatment fluid acidizes the subterranean formation to dissolve acid-soluble materials in a single stage, and
wherein the treatment fluid is diverted to untreated zones of the subterranean formation.

* * * * *